Feb. 25, 1969   L. L. B. BRUNET   3,429,142
WATCH BAND ADJUSTABLE CLASP
Filed May 24, 1967
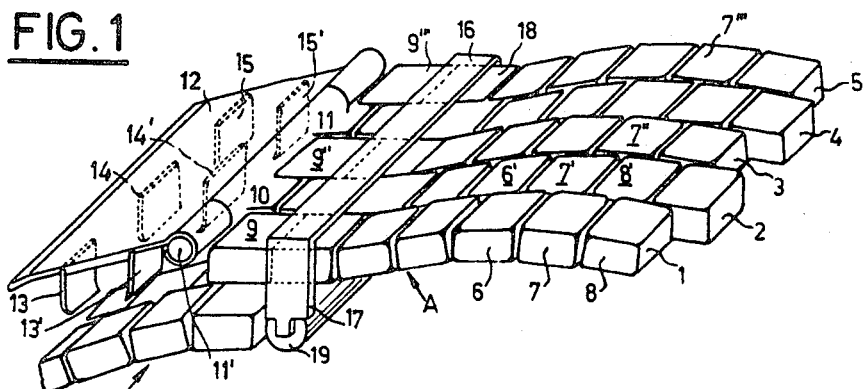
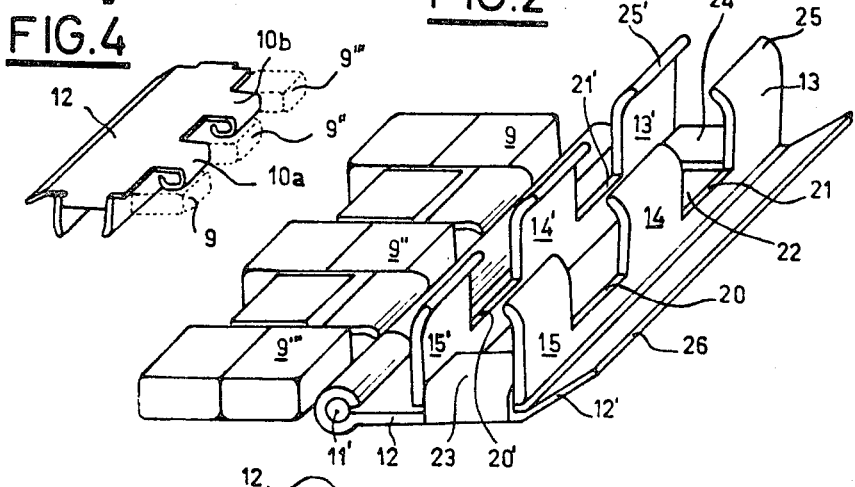
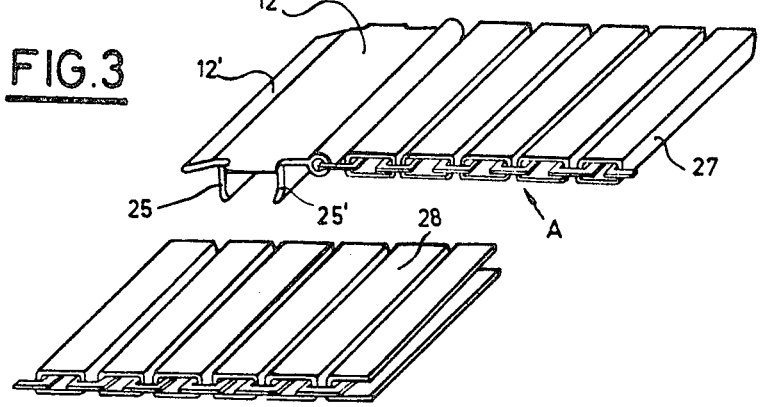

United States Patent Office 3,429,142
Patented Feb. 25, 1969

3,429,142
WATCH BAND ADJUSTABLE CLASP
Louis L. B. Brunet, Annecy, France, assignor to S. A. Zuccolo Rochet & Cie, Annecy, France, a company of France
Filed May 24, 1967, Ser. No. 640,872
Claims priority, application France, May 26, 1966, 63,008
U.S. Cl. 63—4
Int. Cl. A44c 5/02, 5/04; A44b 19/00
7 Claims

ABSTRACT OF THE DISCLOSURE

This disclosure concerns a flexible wrist watch band composed of spaced transverse links of a given length forming two distinct chains each with a free end, these ends being arranged in partially overlapping relation, a guide loop pivoted at the end of one chain through which the other end passes, a terminal plate hinged to the other end and on this terminal plate at least one pair of elastically deformable, claw-like members are separated from one another by a distance at least equal to the length of the links and fitting between at least some of these links for releasably securing the two chains in clasped relation.

---

There are known metallic wrist bands which are generally elastic in the longitudinal direction and have a certain suppleness in the transversal direction in order to adapt themselves correctly to the wrist of the wearer, such a band comprising two strands attaching themselves respectively to the opposite sides of a watch case and each made either by a row of adjacent elements such as links, longitudinal rows of small elements or pieces of various shapes such as parallelepidedal, the parallelepipedal parts of one row being staggered relative to those of adjacent rows.

The invention is concerned with a fastener of the clasp type which is simply and inexpensively made and also has the advantage of not increasing the thickness of the band such that the band can be readily used with an extra thin watch.

The clasp fastener according to the invention is characterised by the fact that it consists of a member carried by one of the parts or chains of the band which is provided with one or several pairs of claws made of an elastically deformable material, the spacing between the claws of a same pair being at the most equal to the length of an element or link of the bracelet.

In the case where the band is constituted by rows of equal links perpendicular to the length of the band, the claws are formed by two blades of the same shape. In the case where the bracelet is composed of staggered elements above indicated, the number of pairs of claws is equal to the number of parallelepipedal elements alined in the transverse direction of the band; this gives a perfect link between the fastener and the strand of the band in which the fastener enters by its claws.

According to a preferred embodiment, the claws are made in an element which is preferably metallic and has the shape of a U in the wings of which are cut openings.

To secure this U-shaped element to the member carried by the free end of the corresponding part of the band, this organ comprises two lateral legs bent back on the transverse branch of the U-shaped element which is thus maintained and secured in place, but this element can be secured by rivetting or by any other suitable means.

In order to ensure secure closing, the free ends of the claws of a same pair are curved one towards the other; there is thus obtained a fastening which partially has the nature of a pawl and ratchet, with good gripping of the claws on the corresponding parallelepipedal elements.

Other characteristics of the object of the invention will appear from the following description given below by way of example, reference being made to the accompanying drawing in which:

FIGURE 1 is a fragmentary perspective view of the band showing the clip fastener device.

FIGURE 2 is a detailed view of the latter.

FIGURE 3 is a partial schematic view of the clasp for a band having rows of equal links perpendicular to the length of the band.

FIGURE 4 is a modification of the way in which the clasp is hooked to the corresponding strand of the band.

In FIGURE 1 the general characters A and B designate the free extremities of two strands of a band which are each constituted by longitudinal rows 1 to 5 of parallelepipedal elements such as 6, 7, and 8, for example, which are staggered relative to the corresponding parallelepipedal elements 6', 7', 8', for example, of the row of elements 2, in such a way that there reoccurs periodically three parallelepipedal elements alined transversely as those designated by 7, 7'', 7'''. Between the terminal parallelepipedal elements 9, 9'', 9''' of the free extremity of strand A of the band are inserted appendages 10 and 11 of a hinge 11' with the aid of which a terminal plate 12 is pivoted to said strand A of the band. Plate 12 has three pairs of claws 13–13', 14–14', and 15–15' intended to fit respectively on both sides of the three parallelepipedal elements alined transversely in strand B.

Strand A passes through a stirrup or loop 16 pivoted or secured by its parallel branches 17 and 18 on a transversal terminal element 19 of strand B.

Details of construction of the fastening device appear on FIGURE 2.

Claws 13–13', 14–14', 15–15' are made of a U-shaped metallic element, by cutting in its two wings pairs of openings 20–20' and 21–21'' located preferably above bottom 22 of the U-shaped element. The latter is secured to plate 12 by two bent lateral legs 23 and 24 having a width equal to the distance between the two wings of this U-shaped element in order to avoid all play. At the point of fastening by these legs, the U-shaped element can be secured to plate 12 by rivetting, welding, bracing or by any other suitable means.

For an improved elasticity of the fastener and better gripping by the claws, the free extremities of the latter are, as extremities 25–25' of claws 13–13', curved towards one another.

Finally, part 12' of plate 12 which is located on the side opposite to hinge 11 relative to the U-shaped element is inclined towards the free crests such as 25 of the claws, in order to fit against the strand B of the band and its thickness can decrease in the direction of its terminal edge 26.

FIGURE 3 shows schematically strands A and B of a band formed by rows of equal links 27, 28 disposed perpendicularly relative to the length of the bracelet and mutually connected in known fashion to permit the use of the band. In this embodiment, the fastener secured to plate 12 pivoted at the extremity of part A carries a pair of claws 25–25' which differ from those of the previous embodiment by the fact that they have no cuts therein.

FIGURE 4 is a perspective schematic view of the method of hooking the claw-provided fastener to the corresponding strand of the band.

According to this embodiment, the appendages 10 and 11 of the pivoting piece 11' are eliminated.

Plate 12 is prolonged by two legs 10a and 10b made integrally in one piece with the latter and bent back to form the hooks coming between the parallelepipedal elements 9', 9'' and 9''', where they will be maintained either by a rigid axis or by an elongated spring (not shown) passing through these elements and through the hooks. Naturally the deformable material of which the claws are made can be any suitable metal or plastic such as brass, steel, polystyrene, polyethylene.

What is claimed is:

1. In combination, a flexible wrist watch band comprising spaced transverse links of a given length forming two distinct chains each with a free end, said ends being arranged in partially overlapping relation, a guide loop pivoted at the end of one chain through which the other end passes, a terminal plate hinged to said other end and on said terminal plate elastically deformable, claw-like members separated from one another by a distance at least equal to said length of said links and fitting between at least some of said transverse links for releasably securing said two chains in clasped relation, said terminal plate comprising a U-shaped element having a central part flanked by two wings, said wings having spaced cuts forming said claw-like members, and said terminal plate having two lateral legs folded over said central part whereby to secure said U-shaped element to said plate.

2. Combination according to claim 1, wherein said chains are formed of sprung staggered links whereby said band is of the stretch-type.

3. Combination according to claim 2, wherein said links forming said chains have a parallelepipedal shape and aligned transversally to said band, and the number of said claws is equal to the number of said parallelepipedal elements.

4. Combination according to claim 1, wherein that part of said terminal plate opposite to said hinge tapers downwardly towards said claw-like members, and has a free end of dimenished section.

5. Combination according to claim 1, wherein the claw-like members of a given pair are curved towards one another so as to exert a lateral pressure on said spaced links when fitting therebetween.

6. Combination according to claim 1, wherein said claw-like members are of metal.

7. Combination according to claim 1, wherein said claw-like members are of plastic.

References Cited

UNITED STATES PATENTS

| | | | |
|---|---|---|---|
| 1,740,885 | 12/1929 | Augenstein | 63—4 |
| 1,779,068 | 10/1930 | Krementz. | |
| 1,892,350 | 12/1932 | Kestenman. | |

BERNARD A. GELAK, *Primary Examiner.*

U.S. Cl. X.R.

24—206; 63—5; 224—4